US005890027A

United States Patent [19]

Ohta et al.

[11] Patent Number: 5,890,027

[45] **Date of Patent: *Mar. 30, 1999**

[54] MINIATURIZED CAMERA EMPLOYING MOTOR MEMBERS

[75] Inventors: Hidefumi Ohta, Kawasaki; Kiyosada Machida, Urawa; Junichi Omi, Kawasaki, all of Japan

[73] Assignee: Nikon Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 734,968

[22] Filed: Oct. 23, 1996

[30] Foreign Application Priority Data

Jan. 23, 1996 [JP] Japan .................................... 8-009093

[51] Int. Cl.$^{6}$ .................................................... G03B 17/02

[52] U.S. Cl. ............................................................ 396/535

[58] Field of Search .................................... 396/535, 538, 396/539, 85, 439

[56] References Cited

U.S. PATENT DOCUMENTS

| | | | |
|---|---|---|---|
| 4,422,740 | 12/1983 | Kawai et al. | 354/402 |
| 4,827,296 | 5/1989 | Haraguchi et al. | 354/187 |
| 5,426,478 | 6/1995 | Katagiri et al. | 354/149.11 |
| 5,436,685 | 7/1995 | Yamashina | 354/202 |
| 5,495,307 | 2/1996 | Koiwai et al. | 354/159 |
| 5,592,255 | 1/1997 | Wakabayashi et al. | 396/89 |
| 5,600,401 | 2/1997 | Kato et al. | 396/542 |
| 5,606,389 | 2/1997 | Sugita | 396/106 |
| 5,640,638 | 6/1997 | Omiya | 396/411 |
| 5,655,171 | 8/1997 | Machida et al. | 396/535 |
| 5,655,172 | 8/1997 | Omi et al. | 396/538 |

*Primary Examiner*—Safet Metjahic
*Assistant Examiner*—Christopher E. Mahoney
*Attorney, Agent, or Firm*—Oliff & Berridge, PLC

[57] ABSTRACT

A miniaturized camera includes a cartridge chamber and a spool chamber positioned on either side of a lens barrel, thereby creating a gap above said lens barrel and a gap below said lens barrel. A battery is positioned in one of said gaps and at least one motor member, such as a lens barrel drive motor, is positioned in one of said gaps. Accordingly, the camera is not enlarged in size and miniaturization can be achieved.

9 Claims, 4 Drawing Sheets

MINIATURIZED CAMERA EMPLOYING MOTOR MEMBERS

BACKGROUND OF THE INVENTION

1. Field of the Invention

This invention relates to a camera in which improvements have been added to the positional arrangement of the battery, and to the positional arrangement of the motor members for camera operation, such as a lens barrel drive motor.

2. Description of Related Art

In order to make camera operation easier, there are cameras generally known that automatically perform operations used during photographing, such as adjustment of exposure, adjustment of shutter speed, focusing, and the like, as well as automatically performing operations such as film feeding or rewinding, and the like. The number of various kinds of electrical parts increases in this type of camera, so that the camera easily expands in size.

Generally, a lens barrel is installed between a cartridge chamber that accommodates the film, and a spool chamber that rewinds the film. A gap is formed between the cartridge chamber and the spool chamber, and above and below the lens barrel. Through effective utilization of the limited space within the gap, cameras have been proposed that are designed for miniaturization in the positional arrangement of the camera operation battery or autofocus (AF) unit.

Cameras are generally known in which the lens barrel retracts into the camera when the camera is not being used and projects when the camera is being used, as well as cameras provided with an electric zoom lens barrel. However, in these cameras, a lens barrel drive motor is needed in order to drive the lens barrel; this is one of the factors hindering camera miniaturization.

SUMMARY OF THE INVENTION

The objective of this invention is to design the miniaturization of a camera employing motor members for camera operation, such as a lens barrel drive motor.

According to the present invention, a camera includes a lens barrel that is installed between a cartridge chamber and a spool chamber. A gap is formed between this cartridge chamber and spool chamber, and above and below the lens barrel. In either of the gaps, a battery and motor members (e.g., a lens barrel drive motor) for camera operation, are positioned. The motor members may include, besides the lens barrel drive motor, electrical parts that perform exposure adjustment, shutter speed adjustment, focusing, flash control, zooming and the like.

In the camera according to this invention, the battery, the height of which is comparatively small, is accommodated within either of the gaps formed above and below the lens barrel. In the remaining empty space, motor members, such as a lens barrel drive motor, are accommodated, so that an efficient positional arrangement of parts is realized. In this positional arrangement of the lens barrel drive motor, the distance between the lens barrel drive motor and the lens barrel becomes small. As a result, the number of elements of a gear train, utilized for transmitting a drive force from the lens barrel drive motor to the lens barrel, decreases.

DETAILED DESCRIPTION OF PREFERRED EMBODIMENTS

A preferred embodiment of this invention is explained below in conjunction with the figures. The items in the construction of this invention are employed in the design of the preferred embodiment of the invention. However, the present invention is not limited to the preferred embodiment.

Figure 1:
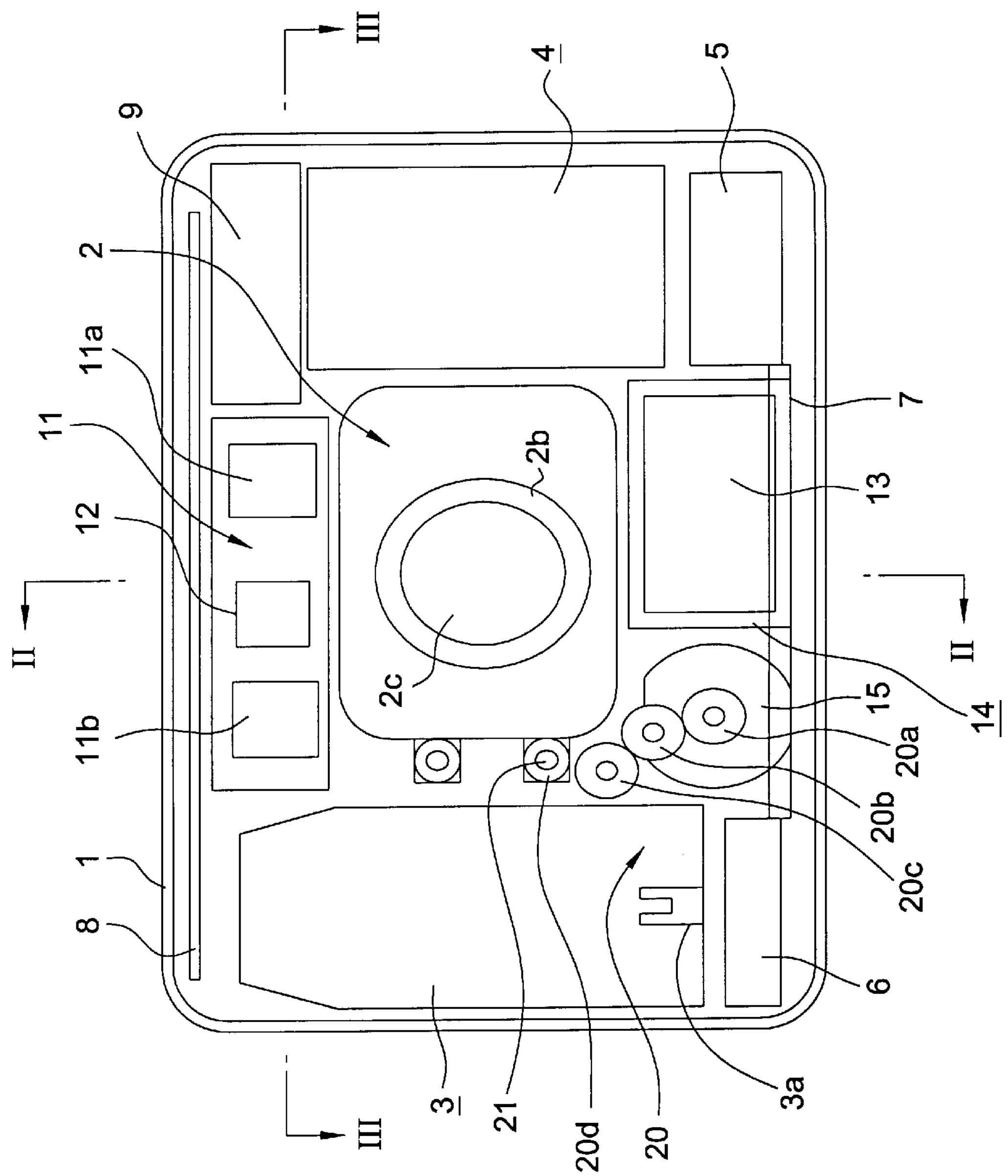
FIG. 1 is a vertical cross-section of a camera according to the present invention.
Figure 2:
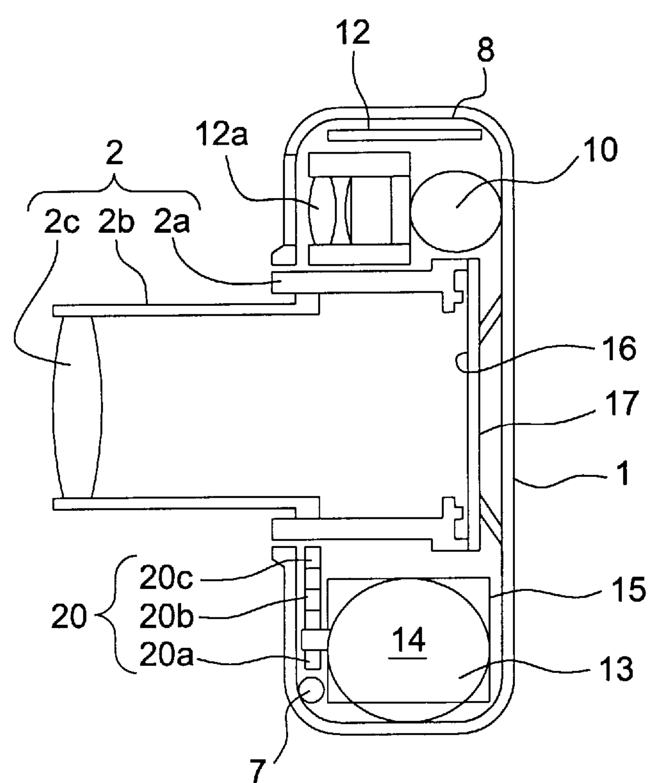
FIG. 2 is a cross-section taken along line II—II of the camera in FIG. 1.
Figure 3:
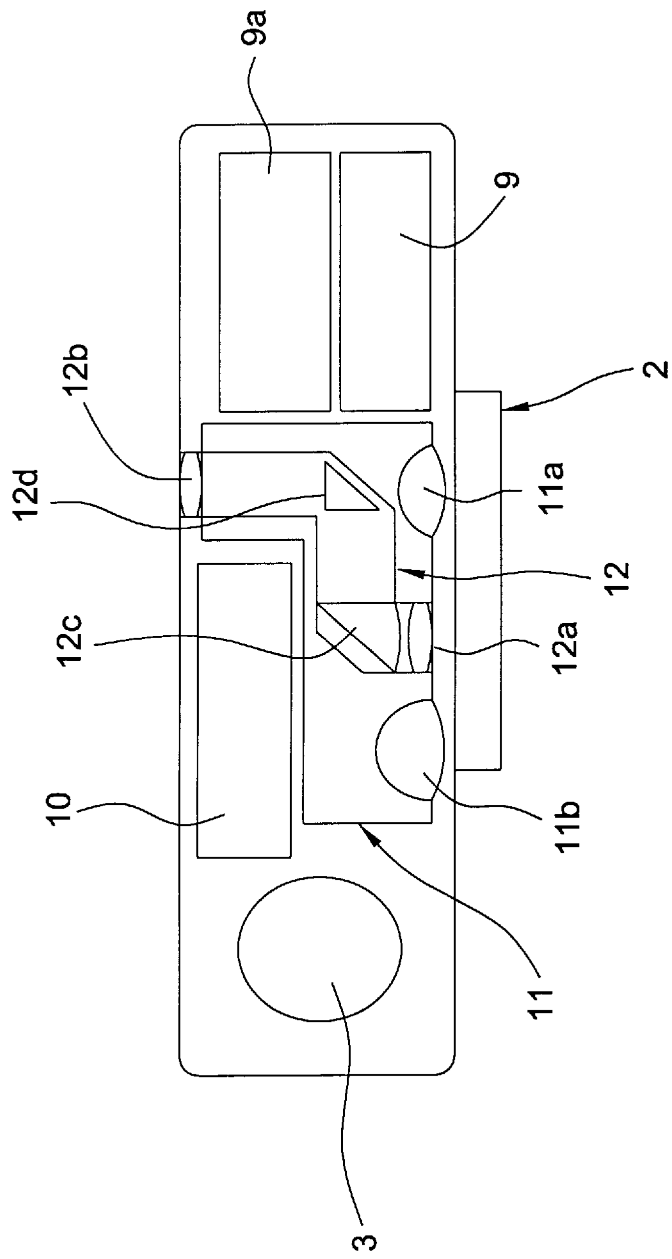
FIG. 3 is a cross section taken along line III—III of the camera in FIG. 1.

FIG. 1 is a front view showing the internal part of a camera in accordance with this invention. FIG. 2 is a cross section taken along the line II—II in FIG. 1, and FIG. 3 is a cross section taken along the line III—III in FIG. 1. As denoted in FIGS. 1, 2 and 3, the entire camera is covered by a main body cover 1. Lens barrel 2 is installed at the center. Lens barrel 2 is constructed from fixed lens barrel 2*a*, moving lens barrel 2*b*, and photographing (imaging) lens 2*c*, positioned in moving lens barrel 2*b*. The cartridge chamber 3 and the spool chamber 4 are established on either side of lens barrel 2, within the main body cover 1. The film cartridge (not shown) is loaded into the cartridge chamber 3, and the film winding spool (not shown) is positioned within spool chamber 4.

Gear box 5 is positioned below spool chamber 4. It receives rotational force from a motor (not shown) that is accommodated within the spool, and rotates the spool, which in turn winds the film from the film cartridge. Also, a gear box 6 is positioned below the cartridge chamber 3. When rotational force from the motor is transmitted from gear box 5, through a drive transmitting shaft 7, to gear box 6, fork 3*a* is driven in rotation, and the cartridge axle (not shown) in the film cartridge is driven, thereby rewinding the film.

A main substrate 8 is accommodated within main body cover 1, in order to control camera electrical parts, in the otherwise empty space above lens barrel 2. Flash 9 (e.g., electronic flash luminescing part 9) is positioned above spool chamber 4. Flash loading substrate 9*a* is positioned behind flash 9, as shown in FIG. 3. Condensor (i.e., Capacitor) 10, used for the flash, is positioned on top of lens barrel 2.

AF block 11, which includes an AF light projector 11*a* and AF light receptor 11*b*, as well as a real image-type finder 12, are positioned in the gap above lens barrel 2, and between the cartridge chamber 3 and the spool chamber 4, as shown in FIG. 1. Finder objective lens 12*a*, and eyepiece lens 12*b*, are accommodated within the real image finder 12, which is constructed so that light entering from finder objective lens 12*a* reflects through prisms 12*c* and 12*d*, and arrives at finder eyepiece lens 12*b*, as shown in FIG. 3.

Battery chamber 14, which accommodates a battery 13 of comparatively low height, and lens barrel drive motor 15, which drives the moving lens barrel 2*b*, in which photographing lens 2*c* is installed, are placed in the gap below lens barrel 2, between cartridge chamber 3 and spool chamber 4.

The rotational force of lens barrel drive motor 15, as denoted in FIGS. 1 and 2, is transmitted to a drive screw 21 through gear train 20, composed of gears 20*a*, 20*b* and 20*c*, which are attached to the motor 15, and gear 20*d*, which is provided onto drive screw 21, which drives moving lens barrel 2*b*. Moving lens barrel 2*b* moves in the optical axis direction, through the rotation of drive screw 21. Through the rotation of motor 15, the rotational force of the motor is transmitted in sequence from gear 20*a* to gears 20*b*, 20*c*, and 20*d*, so that drive screw 21 rotates. Because drive screw 21 and moving lens barrel 2*b* are screw-meshed, when drive screw 21 rotates, moving lens barrel 2*b* moves back and forth along the optical axis corresponding to the direction of the rotation of motor 15.

In this preferred embodiment, when a main switch is OFF (not shown), the moving lens barrel 2*b* retracts into the so-called retracted position, so that when the camera is not in use, the camera is slim. When the main switch is ON (not shown), motor 15 is driven, and moving lens barrel 2*b* projects to the photographing position. When a release button (not shown) is pushed during imaging, the moving lens barrel 2*b* further moves in the optical axis direction, so that light beams are focused on the film 16 to form the image of the subject. Film 16 is maintained as planar by compression plate 17 in the same way as in conventional cameras.

In a camera according to this preferred embodiment, battery chamber 14 is positioned in the right side (in FIG. 1) of the gap, or empty space, below lens barrel 2, which is itself in the space between cartridge chamber 3 and spool chamber 4. Battery 13, with a comparatively short axis, is accommodated sideways in the battery chamber 14, so that a surplus space is provided between the left end surface of battery 13 and cartridge chamber 3. In this way, lens barrel drive motor 15 can be accommodated within the camera without expanding or increasing the camera size.

Lens barrel drive motor 15 is positioned in the left side (in FIG. 1) of the gap, or empty space, below lens barrel 2, so that the distance between lens barrel drive motor 15 and lens barrel 2 is small. As a result, the driving force of lens barrel drive motor 15 is transmitted to lens barrel 2 through only a small number of elements in the gear train 20, resulting in increased space efficiency and contributing to lower camera cost.

Figure 4:
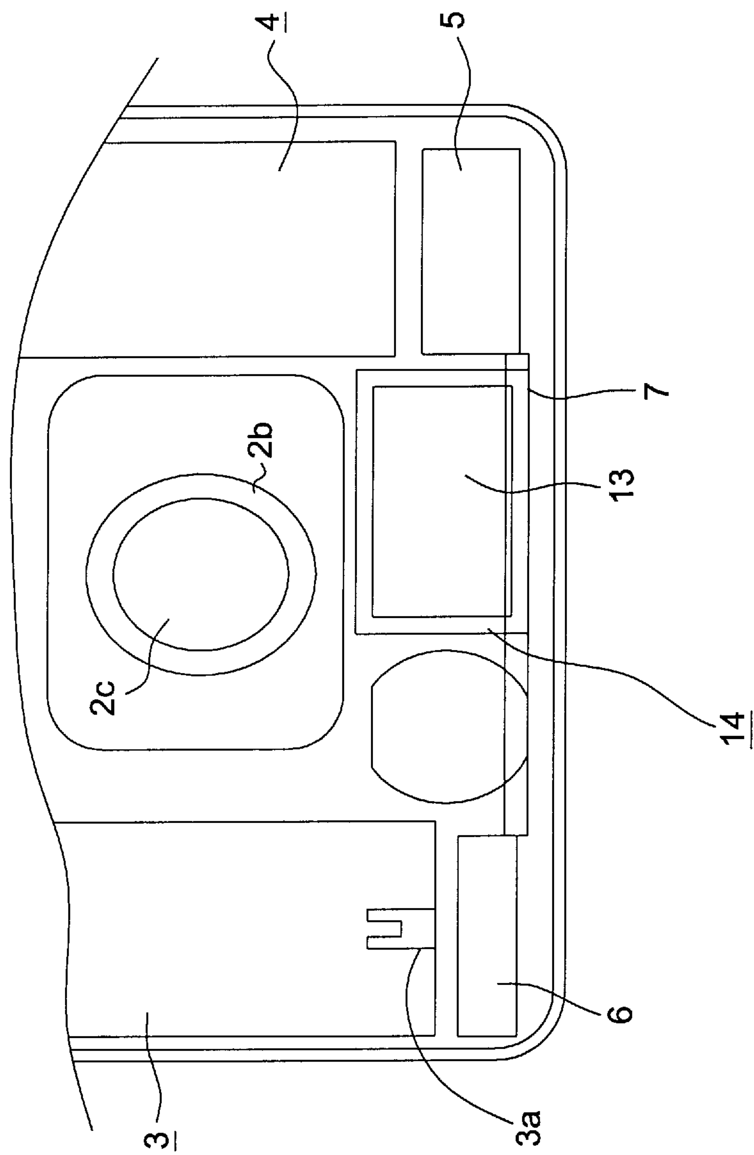
FIG. 4 is a partial vertical cross-section of a camera according to another embodiment of the present invention.

Although in this embodiment, battery 13 and lens barrel drive motor 15 are positioned in the empty space below lens barrel 2, the battery 13 can be installed with one of various types of capacitors 10 instead as shown in FIG. 4. The battery 13 may also be installed with another of the various types of drive systems or control circuits. Lens barrel drive motor 15 is driven in an interlocking fashion with the main switch ON (not shown), so that moving lens barrel 2*b*, in the retracted position within the camera main body, is projected out of the camera main body to the photographing position. A zoom motor, for altering the zoom lens focal position, or a focusing motor, may be lined up with battery 13. Battery 13 and the aforesaid motor members may be positioned in the gap or empty space above lens barrel 2, which is itself in the space between cartridge chamber 3 and spool chamber 4.

As described above, the battery and the motor members are positioned in one of the gaps (i.e., empty space) above or below the lens barrel between the cartridge chamber and the spool chamber. Through efficiency of space, more room is provided in a camera according to this invention. In this way, the electrical parts supplied to make the camera fully automatic, can be accommodated within the camera without increasing the camera size, thus contributing greatly to camera miniaturization and cost reduction.

Through the positional arrangement of the lens barrel drive motor in one of these gaps, the distance between the lens barrel drive motor and the lens barrel decreases. The number of elements necessary in the gear train, which transmits the driving force of the lens barrel drive motor to the lens barrel, decreases with the result that space can be more efficiently used within the camera, and cost reduction in cameras can be achieved.

What is claimed is:

1. A camera, comprising:

a cartridge chamber and a spool chamber positioned on either side of a lens barrel, thereby creating a first gap above said lens barrel surrounded by said lens barrel, said cartridge chamber and said spool chamber and a second gap below said lens barrel also surrounded by said lens barrel, said cartridge chamber and said spool chamber; and at least two of a battery, a capacitor and a motor are located in said second gap.

2. The camera recited in claim 1, wherein said motor is selected from the group consisting of a lens barrel drive motor, a zoom motor and a focusing motor.

3. The camera recited in claim 2, wherein said motor is a lens barrel drive motor and said camera further comprises a gear train rotationally connected to said lens barrel drive motor for moving said lens barrel in an optical axis direction.

4. The camera recited in claim 2, wherein said battery and said motor are positioned in said second gap below said lens barrel.

5. The camera recited in claim 1, further comprising an autofocus block in said first gap above said lens barrel.

6. The camera recited in claim 5, wherein said autofocus block comprises an autofocus light projector, an autofocus light receptor, and a real image-type finder.

7. The camera recited in claim 1, wherein said capacitor is positioned in said first gap above said lens barrel, and said battery and said motor are located in said second gap.

8. The camera recited in claim 1, further comprising electrical parts for performing exposure adjustment, shutter speed adjustment and flash control.

9. The camera recited in claim 1, further comprising means for driving said lens barrel in response to rotation of said motor.

* * * * *